United States Patent [19]
Toews

[11] 3,912,338
[45] Oct. 14, 1975

[54] WEAR RESISTANT GROUSER BAR

[75] Inventor: Leonard E. Toews, Greensburg, Pa.

[73] Assignee: Kennametal Inc., Latrobe, Pa.

[22] Filed: Feb. 21, 1974

[21] Appl. No.: 444,378

[52] U.S. Cl. .................................. 305/54; 305/38
[51] Int. Cl.² ............................................ B62D 55/08
[58] Field of Search ............ 305/54, 55, 39, 46, 38, 305/11, 12, 13; 152/226; 301/44 T

[56] References Cited
UNITED STATES PATENTS

| | | | |
|---|---|---|---|
| 1,400,358 | 12/1921 | Gunderman | 301/44 T |
| 3,071,417 | 1/1963 | Militana | 305/54 |
| 3,558,198 | 1/1971 | Tomita | 305/54 |
| 3,612,626 | 10/1971 | Fuchs | 305/38 |
| 3,779,617 | 12/1973 | Palmaer | 305/38 |

*Primary Examiner*—Philip Goodman
*Assistant Examiner*—John A. Carroll
*Attorney, Agent, or Firm*—Melvin A. Crosby

[57] ABSTRACT

A steel bar for welding to an endless track to impart wear resistance to the track while, also, improving the grip of the endless track on the ground in which the bar is constructed to extend transversely to the endless track and is formed at the base for being welded to the track while the outer edge is provided with hardfacing in the form, especially, of cemented hard carbide inserts which can be in the form of spaced cylindrical button elements or blocks arranged in side by side relation.

6 Claims, 6 Drawing Figures

WEAR RESISTANT GROUSER BAR

The present invention relates to elements for reinforcing steel endless track members and is particularly concerned with such an element which is referred to as a grouser bar and which is fixed to the endless track so as to extend transversely thereof and project outwardly therefrom.

Much heavy machinery employed in excavating operations utilizes endless track means of steel consisting of interconnected steel plates which form the endless track and which track is entrained about supporting and driving rollers or wheels. Such endless tracks work under extreme conditions of abrasion and are, furthermore, required to develop the entire horizontal thrust which the respective machine must produce.

Since the endless tracks run in conditions where the track is subjected to severe abuse, either on account of highly corrosive earth conditions or because of rocks and the like, the outwardly projecting lugs with which the track is provided tend to wear away rapidly with the loss of the lugs, thus, brought about exposing the remainder of the endless track with the abrasive condition.

The lugs are also depended upon to grip the ground so that substantial working forces in the horizontal direction can be developed on the machine. This loading of the machine is transmitted to the lugs and this causes even more rapid wear thereof. Also, in order to develop the necessary horizontal thrust on the machine, the lugs on the endless tracks are required to penetrate the surface on which the machine is placed.

As mentioned, this surface sometimes contains considerable rock or is relatively hard and may even be frozen. Under such circumstances, it is highly important that the lugs have penetrating power so that the endless tracks will not slip on the supporting surface.

With the foregoing in mind, a primary objective of the present invention is the provision of a repair or replacement element in the form of a grouser bar or an endless steel track which exhibits substantially increased life in use and which has substantially increased gripping power over heretofore known grouser bars.

A further object is the provision of a grouser bar of the nature referred to which can be made relatively simply and inexpensively while still achieving longer life.

BRIEF SUMMARY OF THE INVENTION

According to the present invention, grouser bars are formed which extend substantially the width of the endless track on which they are to be mounted. These bars are positioned to extend transversely of the endless track on the outer side thereof at spaced locations along the track. The track may consist of steel plates placed in articulated end to end relationship and there could be a transversely extending grouser bar on each of the plates.

Each grouser bar is formed of steel, as is the endless track, and at the base end of the grouser bar which is adjacent the track, the formation of the grouser bar is such as to facilitate welding thereto to the respective steel plate. The plates are originally formed with transversely extending outwardly protruding lugs which wear off in use and the grouser bars are welded to the outer ends of the worn down lugs.

The outer end of each grouser bar is provided with hard wear resistant elements mounted therein, especially cemented hard carbide elements, and which may be in the form of cylindrical rod-like buttons placed in respective holes distributed along the length of the grouser bar, or the elements may be in the form of cubical blocks of cemented carbide material mounted in side by side relation in a slot provided therefor and extending longitudinally along the outer end of the grouser bar.

In either case, the inserts are preferably brazed in place in the grouser bar, although in the case of the cylindrical rod-like buttons, these elements can be press fitted in place and will remain firmly seated in the bores for the life of the grouser bar.

When cubical blocks are employed in the outer edge of the grouser bar, these blocks preferably taper inwardly to an edge when viewed in the longitudinal direction of the grouser bar thereby providing a long sharp edge which will penetrate the supporting surface on which the endless track rests.

The several objects and advantages as well as still other objects and advantages will become apparent upon reference to the following detailed specification taken in connection with the accompanying drawings in which.

DETAILED DESCRIPTION OF THE INVENTION

Figure 1:
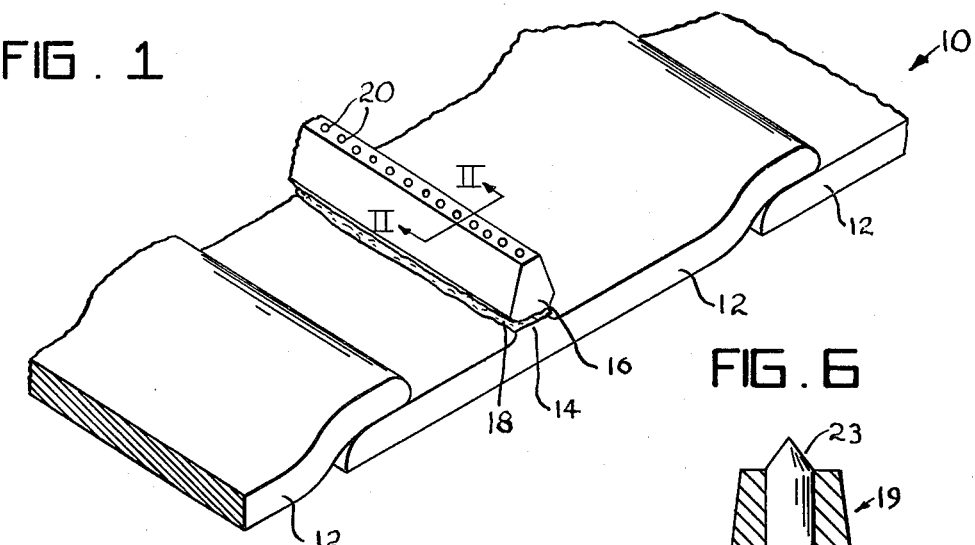
FIG. 1 is a fragmentary perspective view showing a portion of an endless track having a grouser bar according to the present invention mounted thereon.

Referring to the drawings more in detail, FIG. 1 shows a portion of an endless track 10 made up of steel plates 12 which are arranged in end to end relationship and are interconnected in articulated relation so as to be able to be entrained about guiding and driving rollers or wheels. In about the middle of the length of at least some of the steel plates, and preferably all of the steel plates, there is an upstanding rib 14 extending transversely of the steel plate and projecting outwardly therefrom so as to engage the surface upon which the endless track rests.

In the normal course of events, the upstanding ribs 14 will wear off in use, and this will expose the remainder of the track to damage by the supporting surface. It is customary to restore such endless tracks by forming steel grouser bars, one of which is indicated at 16, which are welded to the outer ends of the worn off lugs 14 as by welding 18.

These grouser bars are conventionally formed of steel and will, in turn, wear away fairly rapidly. Furthermore, the grouser bars are often provided with added plates welded thereon protruding from different ones of the grouser bars in different places to provide means for penetrating the supporting formation and thereby imparting greater gripping power to the endless track.

According to the present invention, the outer ends of the grouser bars are provided with hard wear resistant inserts 20 mounted therein and distributed longitudinally of the grouser bar and advantageously formed of cemented hard metal carbide, such as tungsten carbide.

These elements protrude outwardly from the outer end of the grouser bar and not only resist wearing off of the grouser bar due to abrasion but, furthermore, present a reduced area to the surface on which the endless track rests and are, thus, capable of increasing the degree of penetration of the grouser bars into the surface.

Even though the extreme outer end of the grouser bar is thus reduced in area for increased penetration, the wear rate of the grouser bar is, nevertheless, greatly reduced due to the extremely high degree of resistance to abrasion of the hard carbide material.

Figure 2:
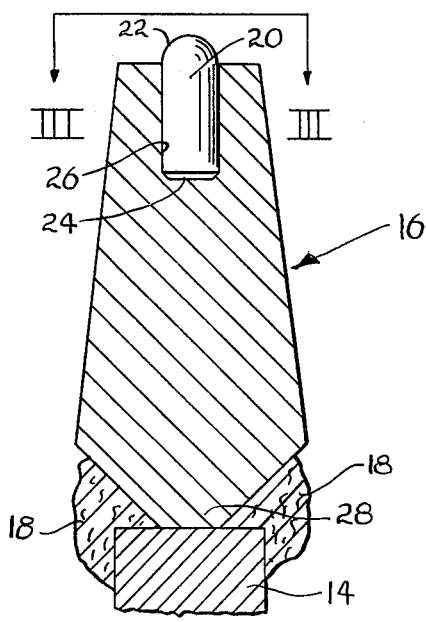
FIG. 2 is a vertical transverse sectional view through the grouser bar and a portion of the track and is drawn at increased scale.
Figure 3:
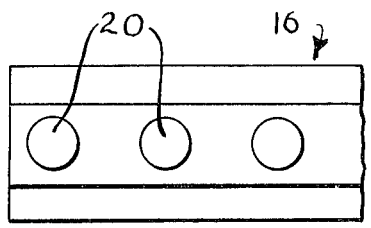
FIG. 3 is a plan view of the grouser bar of FIG. 2, partly broken away.

FIGS. 2 and 3 show more in detail one form which a grouser bar according to the present invention can take. In these figures, it will be noted that the elements 20 are distributed along the length of the grouser bar in spaced relation while each element 20 is in the form of a cylindrical rod-like element having a rounded outer end 22 and a substantially flat inner end 24.

The grouser bar is provided with holes 26 distributed therealong and the elements 20 are either press fitted into the holes or fixed therein as by brazing with at least the rounded outer ends protruding outwardly from the grouser bar. The grouser bar at the outer end in the front to back direction is substantially wider than the diameter of the inserts 20, up to about twice as wide, and tapers outwardly in the inner direction to a maximum width and thereafter tapers inwardly at a sharper angle to a smaller base region 28.

The smaller base region is adapted to engage the outer end of the lug region 14 of the respective plate so that the welding 18, which is in the form of fillet welds, can be applied thereto. Advantageously, the grouser bars 16 are slightly shorter in length than the width of the endless track, and this permits the welding 18 to be carried around the opposite ends of the grouser bars.

Figure 4:
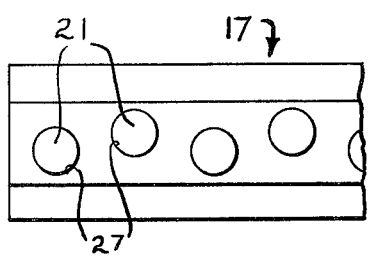
FIG. 4 is a view like FIG. 3 but showing a modification.

FIG. 4 shows a modification in which the steel bar 17 forming the body of the grouser bar is provided with a row of holes 27 extending therealong but in staggered relation. Inserts 21 are inserted in the holes similarly to the way in which inserts 20 are inserted in the holes 26 in the first described modification. The inserts can be press fitted into the holes or they can be brazed into the holes.

The inserts 21 of FIG. 4 are smaller in diameter than inserts 20 of the first modification and, for this reason, could be spaced somewhat more closely together, and there can be more of the inserts in a given grouser bar when the smaller inserts are employed than when the larger ones are employed.

Press fitting the inserts in the bar will be satisfactory in many cases, but where the surface on which the endless track runs is highly abrasive, this may wear away or "wash out" the steel of the grouser bar from the sides of the insert and, in this event, if the inserts are brazed in, they will be held to the steel even if exposed on one side.

In any case, the inserts are hard solid pieces, preferably formed of a cemented hard carbide material, such as tungsten carbide, and are surrounded and supported by the steel and are, thus, deployed in a favorable manner. Furthermore, since the hard material provided on the grouser bar in conformity with the present invention is of a discontinuous nature, even bending of the grouser bar, which might occur under extreme conditions, will not cause cracking or fracturing of the hard material.

In the case of a continuous hard member or hardfacing applied continuously to the grouser bar, as by flame deposition or the like, such cracking or fracturing promotes rapid further breaking away and chipping away of the hard material thereby exposing the steel and causing rapid wear of the substrate steel.

By providing the hard material in conformity with the present invention, this eventuality is avoided and the grouser bar will have extremely long life due to its resistance to abrasion while, at the same time, the penetrating capability of the grouser bar is greatly enhanced.

Figure 5:
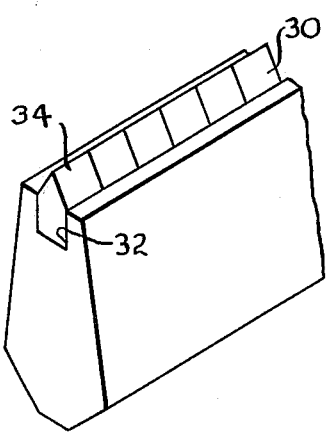
FIG. 5 is a perspective view showing a grouser bar like that of FIG. 2 except being provided with blocks in the outer edge of the grouser bar instead of the cylindrical buttons shown in FIG. 2.

The grouser bar could be provided with blocks 30 arranged in side by side relation in a groove 32 provided in the outer end of the grouser bar rather than the inserts if so desired. This is illustrated in FIG. 5. When the blocks 30 are mounted in the groove 32, the blocks are held in place in the grouser bar by brazing extending along the walls of the groove 32 and advantageously also between the blocks so that an extremely solid connection of the blocks to each other and to the grouser bar is effected. The blocks 30 have the protruding outer ends tapering inwardly to an edge 34 which is relatively sharp and which forms an ideal instrument for penetrating the surface on which the endless track is running.

As an example of the sizes to which the grouser bars can be made, a bar might vary from 12 to 36 inches or even more and, in vertical heighth, from the base end of the outer end, might range from fifteen-sixteenths up to 2 inches or more. The grouser bar at the maximum width where the base portion joins the outer portion, might vary from one-half inch to an inch. The base portion might vary from one-eighth inch to one-fourth inch or more, and the outer end might vary from about nine-thirty seconds inches for the smaller up to about 1 inch for a larger one.

The button type inserts 20 might range from about one-quarter inches to about one-half inches in diameter and about one-half inches to about five-eighths inches in axial length. In respect of the blocks 30, these might vary from about one-quarter inches to about one-half inches in front to back dimension and be about 1 inch long in the direction of the length of the grouser bar.

The blocks 30, in heighth, from the base to the peak could range from about three-eighths inches up to about an inch. The peaked protruding outer ends of the blocks 30 could advantageously be formed to about an included angle of 90° between the two inclined faces which meet to form the edge 34.

Figure 6:
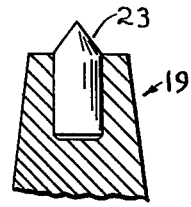
FIG. 6 is a fragmentary view showing a pointed insert.

FIG. 6 is a fragmentary view in which the insert has a pointed outer end 23 and is set in a bar 19 similar to bar 16 illustrated in FIGS. 1 and 2.

Modifications may be made within the scope of the appended claims.

What is claimed is:

1. An endless metallic track and a grouser bar element welded to the endless metallic track so as to protrude outwardly therefrom comprising; a steel body positioned transversely on the endless metallic track and protruding outwardly therefrom toward the side of the metallic track which engages the ground, said body on the one edge which faces the metallic track welded to the track, said body on the other edge which faces outwardly from the metallic track being provided with recess means of substantial depth, and insert means of a hard wear resistant material fixedly mounted in said recess means, said insert means substantially filling said recess means and having a minor portion only of the length thereof protruding outwardly from the said other edge of the said body.

2. An endless metallic track element according to claim 1 in which said hard wear resistant material comprises cemented hard metal carbide.

3. A grouser bar element adapted for welding to an endless track and comprising; a steel body adapted for being positioned transversely on an endless track and protruding outwardly therefrom toward the side of the track which engages the ground, said body on the one edge which faces said track being weldable to the track, said body on the other edge which faces outwardly from the track being provided with a groove means extending longitudinally along said other edge and insert means comprising blocks of hard wear resistant material fixedly mounted in side by side relation in said groove and having tapered end portions protruding outward from the groove and defining a sharp edge extending along the said bar element, and brazing material securing said blocks in said groove.

4. A grouser bar according to claim 3 in which said hard wear resistant material comprises cemented hard metal carbide.

5. A grouser bar element adapted for welding to an endless track and comprising; a steel body adapted for being positioned transversely on an endless track and protruding outwardly therefrom toward the side of the track which engages the ground, said body on the one edge which faces said track being weldable to the track, said body on the other edge which faces outwardly from the track being provided with recess means, and insert means of a hard wear resistant material fixedly mounted in said recess means and protruding outwardly from the said other edge of the said body, said insert means comprising rods having rounded outer ends, said recess means comprising a hole for each rod, each rod being fixed in a respective hole with the rounded end protruding, said holes being distributed along said other edge of said body, with the axes of said holes being parallel and staggered laterally along said other edge of said body.

6. A grouser bar according to claim 5 in which each said rod is formed of cemented hard metal carbide.

* * * * *